United States Patent [19]
Stolzer

[11] 3,760,678
[45] Sept. 25, 1973

[54] BOW SAW MACHINE

[75] Inventor: Paul Stolzer, Achern, Germany

[73] Assignee: Anna Stolzer d.b.a. Firma Karl Stolzer, Achern, Germany

[22] Filed: June 15, 1972

[21] Appl. No.: 263,101

[30] Foreign Application Priority Data
June 29, 1971 Germany.................. P 21 32 238.3

[52] U.S. Cl.................... 83/776, 83/639, 83/647
[51] Int. Cl....................... B23d 49/02, B23d 51/20
[58] Field of Search.................... 83/642, 647, 639, 83/753, 754, 755, 756, 757, 758, 768, 776, 779, 780, 786

[56] References Cited
UNITED STATES PATENTS

| | | | |
|---|---|---|---|
| 2,300,047 | 10/1942 | Jensen et al. | 83/647 X |
| 2,182,289 | 12/1939 | Eisenlohr | 83/639 X |
| 2,412,311 | 12/1946 | Ziska | 83/647 X |
| 3,492,902 | 2/1970 | Stolzer | 83/647 X |
| 3,288,008 | 11/1966 | Stolzer | 83/647 X |

FOREIGN PATENTS OR APPLICATIONS

| | | | |
|---|---|---|---|
| 623,687 | 12/1935 | Germany | 83/647 |
| 662,713 | 8/1938 | Germany | 83/647 |

Primary Examiner—Andrew R. Juhasz
Assistant Examiner—James F. Coan
Attorney—George H. Spencer et al.

[57] ABSTRACT

A hydraulic system in a bow saw machine, operating in conjunction with a carriage carrying the bow for the saw blade, and providing for the application of the saw blade to a workpiece in the machine, the application of sawing pressure during a cutting stroke, and the retraction of the blade from the workpiece during a return stroke. A crank drive and guide structure disposed between the carriage and the bow provide for reciprocal, rectilinear guided movement of the blade with respect to the workpiece clamped on a pedestal of the machine. The hydraulic system has a cylinder-piston assembly wite the cylinder connected to the carriage and with the piston connected, through a piston rod, to the pedestal. A pump and a charging piston in the system are in hydraulic communication with a first chamber in the cylinder of one side of the piston and are operated by actuating elements associated with the crank drive. Hydraulic fluid under pressure, as supplied by the charging piston and pump, acts to apply and retract the saw blade with respect to the workpiece. In addition, a fluid under pressure, supplied from a reservoir, constantly acting within a second chamber on the other side of the piston provides an arrangement to compensate for the weight of the carriage and the components carried on it.

14 Claims, 5 Drawing Figures

BOW SAW MACHINE

BACKGROUND OF THE INVENTION

This invention relates to bow saw machines.

In a known bow saw machine there is a guide with a crank drive for the saw frame. A workpiece can be clamped by means of jaws to a table plate on the machine chassis and the saw frame is movable, with weight compensation, in relation to the chassis. A cylinder-piston assembly is connected with the machine chassis and the movable saw parts.

In this known machine there is an arrangement to generate hydraulic cutting pressure and saw blade feed towards the workpiece. This arrangement includes a charging piston which acts through a pressure valve upon the cylinder-piston assembly. This charging piston is displaceable in dependence upon the saw frame reciprocating movement and is connected through a suction valve to a collecting container for the hydraulic pressure fluid. Because of the movement of this charging piston, which occurs in one direction of the storke of the saw frame, pressrue fluid for the saw blade feed movement passes into the cylinder chamber of the cylinder-piston assembly to drive the piston in a direction to increase the chamber volumes. During the course of the cutting stroke of the saw frame, the pressure fluid flows out of the cylinder chamber, under the action of the cutting pressure exerted upon the saw blade, through an adjustable outlet throttle valve at a rate dependent on the setting thereof.

The hydraulic arrangement described in part in the preceding paragraph also includes a cam disc rotating in dependence upon the saw frame drive and arranged in the movable saw parts on a shaft mounted therein. This cam disc actuates a pump that is connected with the cylinder chamber of the cylinder-piston assembly to effect the lifting of the saw blade away from the workpiece, and its placing upon the workpiece, during the course of the reversal of reciprocating movement of the saw frame.

In this known bow saw machine the movable saw parts are pivotably mounted on the machine chassis. The machine operates with a thrusting cut, and with the saw blade clamped obliquely to the saw frame guide, so that the charging piston delivers the pressure fluid for the saw blade feed motion into the cylinder chamber of the cylinder-piston assembly during the idle stroke of the saw frame. For this purpose an appropriate control straight-edge, acting upon the charging piston, is fitted on the saw frame.

A modified bow saw machine is disclosed in German Gebrauchsmuster (Utility Patent) No. 1,957,612. This machine differs from that described above in that the charging piston is actuated by a circular eccentric which is also seated on the shaft, and in that the rotating cam disc is also formed as a circular eccentric. In this arrangement the articulated saw parts are directly supported on the piston rod of the cylinder-piston assembly.

Bow saw machines operating with drawing or thrusting cut are also known in which the saw blade is clamped parallel with the saw frame guide, which is articulated pivotably to the machine chassis, and the cutting pressure is also generated hydraulically during the cutting storke.

A bow saw machine with the saw blade clamped in the saw frame parallel to the saw frame guide is also known in which the feed motion is effected by displacement of the movable saw parts perpendicularly to the machine chassis. Here, however, for the saw frame guide it is necessary to provide a heavy structure, even protruding beyond the reciprocating stroke of the saw frame, and this involves considerable construction expense.

It is common to all known bow saw machines that they are necessarily of relatively large and heavy construction if they are to have a useful cutting range capacity, that is to say a capability for cutting off lengths of workpieces having the cross sections ordinarily encountered.

SUMMARY OF THE INVENTION

Therefore it is an object of the present invention to provide a bow saw machine which is sufficiently compact to be used as a manually transportable appliance, especially a bench appliance, so that it can readily be carried by an operator on building sites or used in other situations involving frequent changes in the working position, and yet has a cutting range capacity to satisfy normal requirements.

It is a further object of the invention to provide such a transportable machine which is of simple but rugged construction, and is inexpensive to produce, without sacrificing the standard of performance which has been achieved in presently known bow saw machines.

According to this invention there is provided a bow saw machine with a machine pedestal of plate form, having a table plate, and provided with a clamping device for clamping a workpiece on the table plate. A rectilinearly guided, reciprocating saw bow frame, with guide and crank drive therefor is mounted on a movable saw frame carriage which is translatable, with weight compensation, vertically, relative to the machine pedestal, along vertical upstanding guide means on the machine pedestal, along vertical upstanding guide means on the machine pedestal. A rectilinear guide for the saw frame is arranged in a rearward portion of the back of the saw frame, in front of the point of action of the crank drive on the saw frame, and a saw blade is fixed to the saw frame parallel to the saw frame guide.

A hydraulic system controls translation of the saw frame carriage for saw blade feed to the workpiece and application of cutting pressure. The hydraulic system includes a cylinder-piston assembly consisting of a hydraulic cylinder containing a piston, and with the piston operatively connected to the machine pedestal while the cylinder is connected to the saw frame carriage. A charging piston is in hydraulic communication through a pressure valve with an inlet of a chamber of said cylinder at one side of the piston therein. With this arrangement relative movement between the cylinder and piston of the cylinder-piston assembly, in response to delivery of pressure fluid from the charging piston to the chamber, urges the saw frame carriage in the direction towards the machine pedestal. This charging piston is in hydraulic communication, through a suction valve, with a container for hydraulic pressure fluid. The cylinder chamber has an outlet in hydraulic communication, through an adjustable outlet throttle valve, with this container for return flow of pressure fluid from the cylinder chamber to the container.

The hydraulic system further includes a hydraulic pump in hydraulic communication with the cylinder chamber, and actuating devices, operable in dependence upon the saw frame reciprocating drive, for actuating the charging piston and the pump in timed relation to the saw frame reciprocating motion. This is done in such manner that the charging piston is caused to draw pressure fluid from the container during the idle stroke and deliver it to the cylinder chamber during the cutting stroke of the saw frame. In addition, raising of the saw frame carriage, for lifting the saw blade away from the workpiece, and lowering of the carriage, for placing the saw blade upon the workpiece, takes place, due to the action of the pump, in the course of reversal of the reciprocating movement of the saw frame.

Due to the fact that movement of the saw frame carriage is translational, the limitation of cutting range capacity involved in prior art machines, where there is pivotable articulation of the movable saw parts, is avoided. Also, in comparison with comparable known bow saw machines, a given cutting range capacity is achieved with a shorter saw frame.

For saw frame guidance and action of the crank drive, in the form of a cross-guide crank, or a crank guide, in known bow saw machines, a plate or the like is provided at the rear of the saw frame. In a machine according to the invention, due to the fact that the saw frame guide is placed in front of the point of action of the crank drive on the saw frame and is arranged in a rearward portion of the saw frame back parallel to the saw blade, the crank drive itself can act in the region of a rear arm of the saw frame, to which one end of the saw blade is fixed and which is perpendicular to the saw blade. With this arrangement the structural length required by the saw frame guide and the crank drive is quite considerably reduced. This is possible because there is no necessity for a projecting structure which is difficult to fabricate.

It is advantageous to provide, as the guide means for the saw frame carriage, two guide columns whose upper ends are secured to a common connection piece, these upper ends being the column ends which are furthest away from the machine pedestal. These two guide columns are preferably at opposite sides of the saw frame carriage.

According to an especially advantageous feature of the invention, the hydraulic cylinder of the cylinder-piston assembly is fixed to the saw frame carriage and slidably embraces one of the carriage guide columns by means of a guide face at each end of the cylinder. As thus arranged, the guide column forms the piston rod of the piston of the cylinder-piston assembly, and also has a piston portion which is located on the column, between its ends, and within the cylinder. Thus, a cylinder-piston assembly on the one hand, and a guide column with guided element thereon on the other hand, are combined into one space-saving unit.

A third guide column may be provided on the machine pedestal and secured at its upper end to the common connection piece of the saw frame carriage guide columns. On this third column a clamping jar which is adjustably displaceable along the column, serves for clamping a workpiece against the table plate of the machine pedestal. This third guide column may be arranged to form, at the same time, an abutment stop for the workpiece. This clamping arrangement has advantages. Apart from the fact that, due to the presence of this third guide column, the stability of the frame, constituted by the machine pedestal, guide columns and common connection piece, is increased, this arrangement provides an additional advantage. This is that the structural length which must be provided for the clamping of the workpiece is so oriented that, by reason of the range of feed motion of the saw frame carriage, it is accommodated in the space which is present in any case. Above all, however, the arrangement provides an arrangement in which it is possible to clamp a wide range of workpieces and at different angular positions in relation to the direction of movement of the saw blade.

In an especially advantageous arrangement the outflow of pressure medium to a pressure medium container, as a result of the cutting pressure, takes place through a bore, provided in the piston rod of the cylinder-piston assembly, which is in communication with the outlet of the cylinder chamber, and an adjustable outlet throttle valve is arranged in this bore. It has proved especially favorable to arrange the outlet throttle valve adjacent the common connection piece and to construct the valve as a ball valve which is spring-loaded by a compression spring. The spring pressure can be adjusted by means of a manually rotatable spiral cam mounted on the common connection piece and against which cam the end of the compression spring that is remote from the ball can be supported either directly or indirectly.

According to another feature of the invention, the weight compensation of the saw frame carriage and the parts of the machine carried in this carriage is provided by a constantly acting fluid pressure applied to a second cylinder chamber of the cylinder-piston assembly, at the opposite side of the piston thereof. Neither the pump nor the charging piston is in communication with this second chamber. The second cylinder chamber may communicate, through a bore provided in the piston rod of the cylinder-piston assembly, with a pressure reservoir which is arranged in the machine pedestal. The container for the pressure medium operating the saw frame carriage also may be arranged on the carriage.

This invention is especially, but not exclusively, directed to a machine which operates with a drawing cut. In that case the third guide column provided for the clamping jaw is preferably arranged to form an abutment stop for the workpiece in the cutting direction.

DESCRIPTION OF THE PREFERRED EMBODIMENTS

Figure 1:
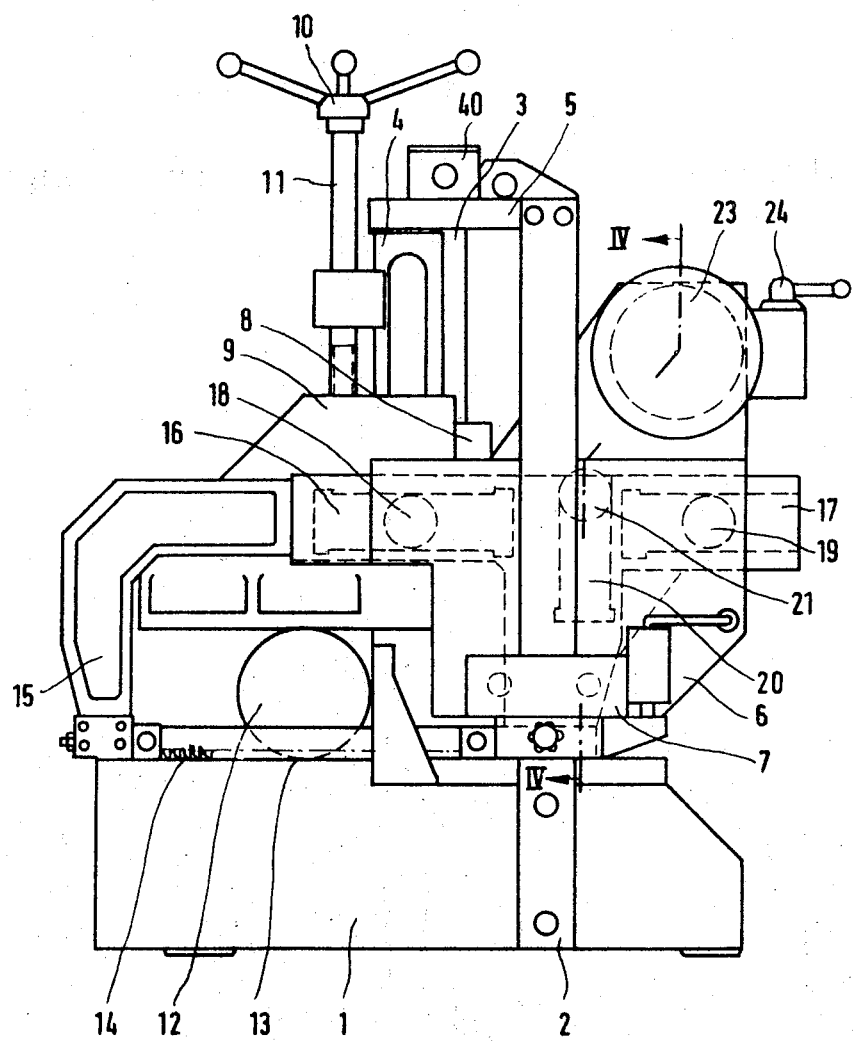
FIG. 1 is a side elevation of one embodiment of a bow saw machine according to the invention.
Figure 2:
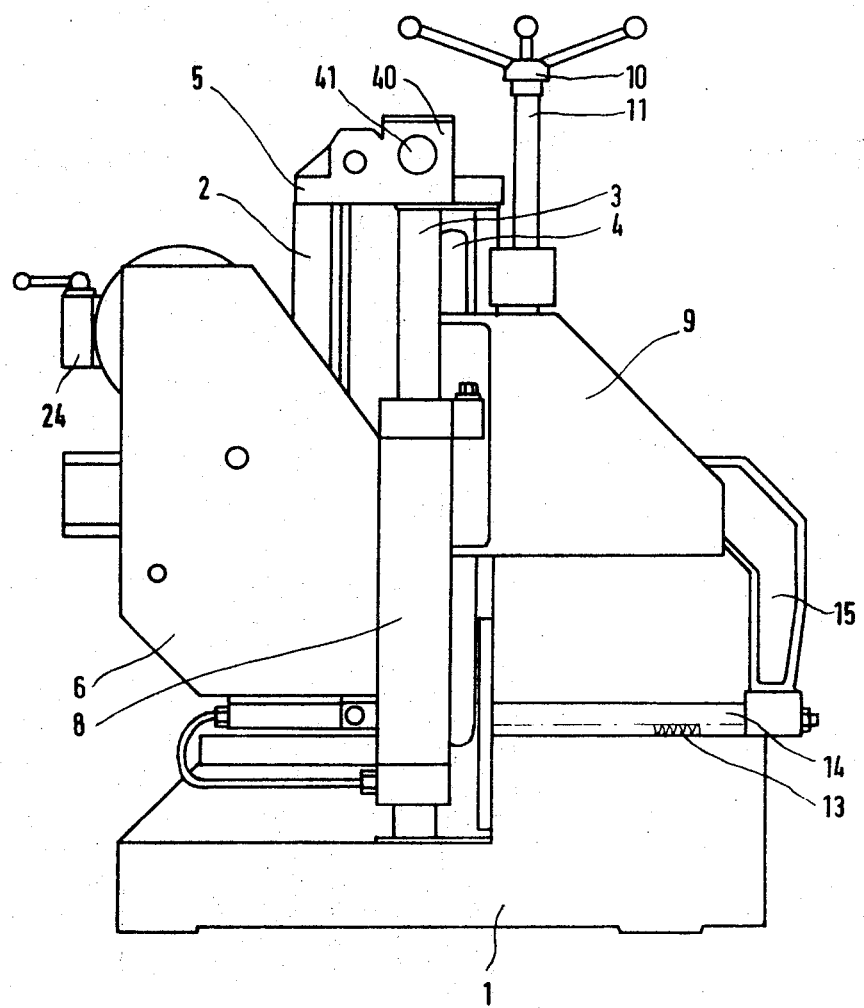
FIG. 2 is a side elevation of the machine of FIG. 1 viewed from the rear.

As seen in FIGS. 1 and 2 of the drawings, the bow saw machine according to the invention has a pedestal 1 from which vertical guide columns 2, 3 and 4, that are secured thereto, extend and these columns are secured at their upper ends to a common connection piece 5. The columns 2 and 3 guide a vertically translatable saw frame carriage 6 which, for this purpose, is provided with a guide sleeve 7 slidable along guide column 2 and a cylinder 8, which surrounds and is slidable along guide column 3. The cylinder 8 constitutes the cylinder of a hydraulic cylinder-piston assembly which will be described below. The column 4 guides a clamping jaw 9 which is vertically adjustable along the guide column 4 by means of a threaded spindle 11 mounted on the column 4 and rotatable by a hand wheel 10, for clamping a workpiece 12 against a table plate 13 of the machine pedestal 1.

A bow frame 15 for a saw blade 14 is mounted on carriage 6 and is rectilinearly guided therein for reciprocation in a path that is parallel to the saw blade by means of rectilinear guide grooves 16 and 17 running on guide rollers 18 and 19 mounted in the carriage 6. The guide 16, in this case, is provided in the back of the bow frame 15, parallel to the saw blade 14.

Figure 4:
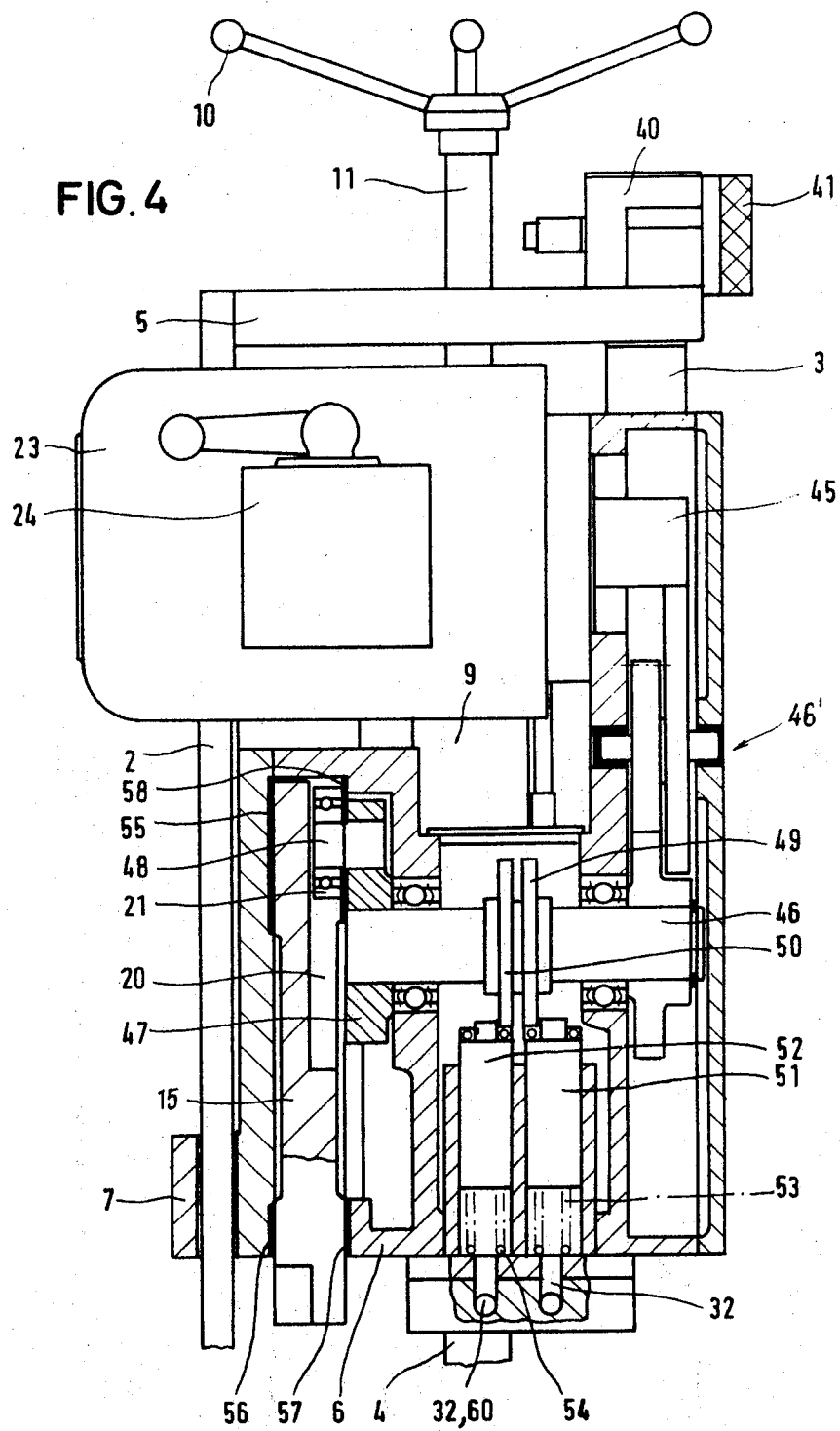
FIG. 4 is a cross-sectional view taken along the line IV—IV of FIG. 1.

Referring also to FIG. 4, a roller 21, mounted on a pin 48 of a drive crank 47, engages in a vertical groove 20 in the bow frame between the two horizontal guide grooves 16 and 17, as seen best in FIG. 1, for reciprocating the bow frame 15 horizontally. This goove 20 is provided in the rear arm of the bow frame 15, and this arm is perpendicular to the saw blade 14.

An electric motor 23, with its switch 24, for driving the machine is mounted on the saw frame carriage 6.

Figure 3:
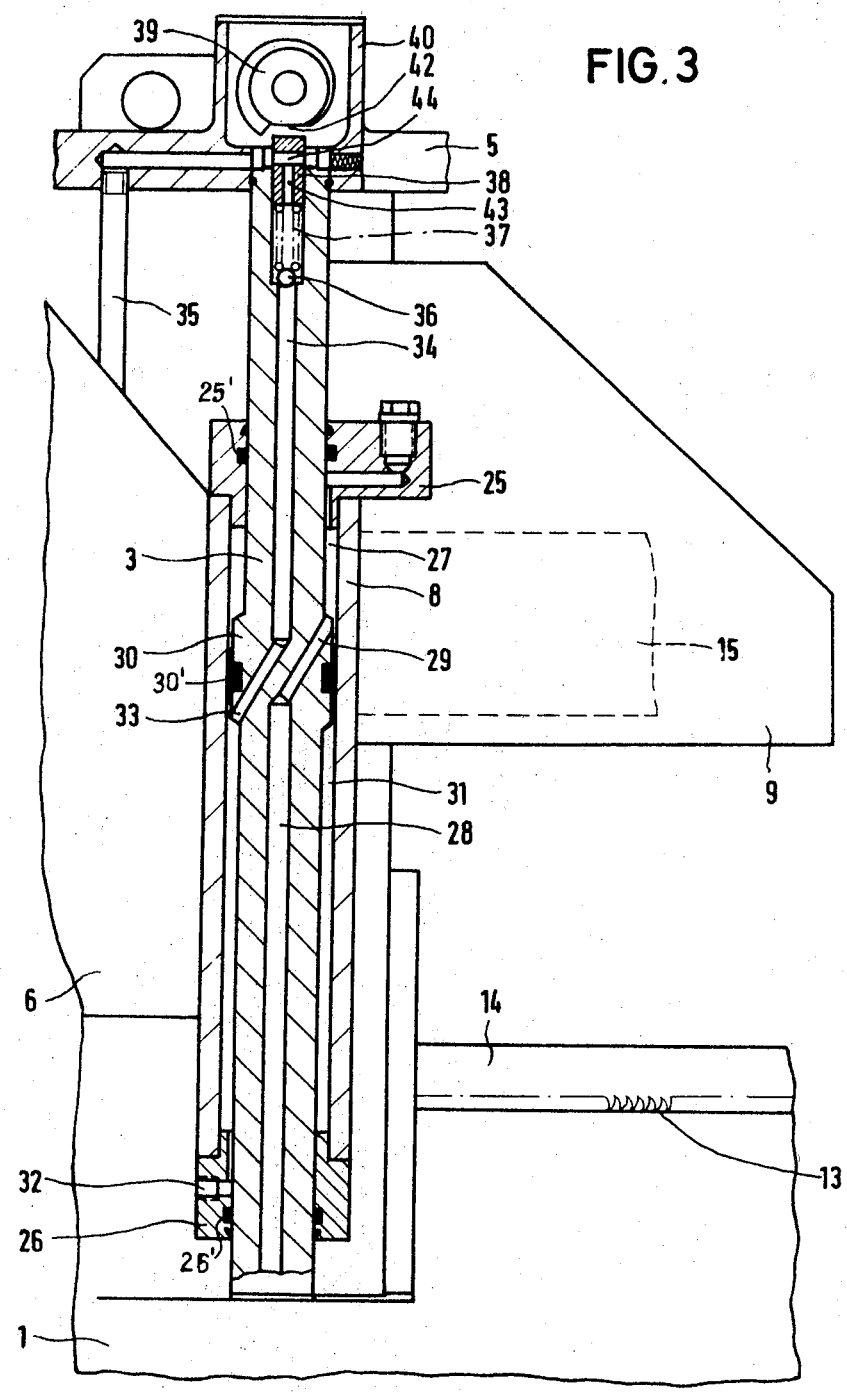
FIG. 3 is a detail view of a portion of the arrangement of FIG. 2, to an enlarged scale and showing details of the cylinder-piston assembly in cross section.

FIG. 3 shows an enlarged detail of that portion of the arrangement of FIG. 2 forming the hydraulic cylinder-piston assembly. From FIG. 3 it may be seen that the guide column 3 also forms a stationary piston rod, with a piston portion 30, in the cylinder 8. The cylinder slidably embraces the column 3 with end closure guide faces 25 and 26. Within the cylinder 8 and between it and column 3, a cylinder chamber 27 is formed at the upper side of piston portion 30 and a cylinder chamber 31 at the lower side of piston portion 30. Suitable sealing rings are provided at 25', 26', and 30'.

Figure 5:
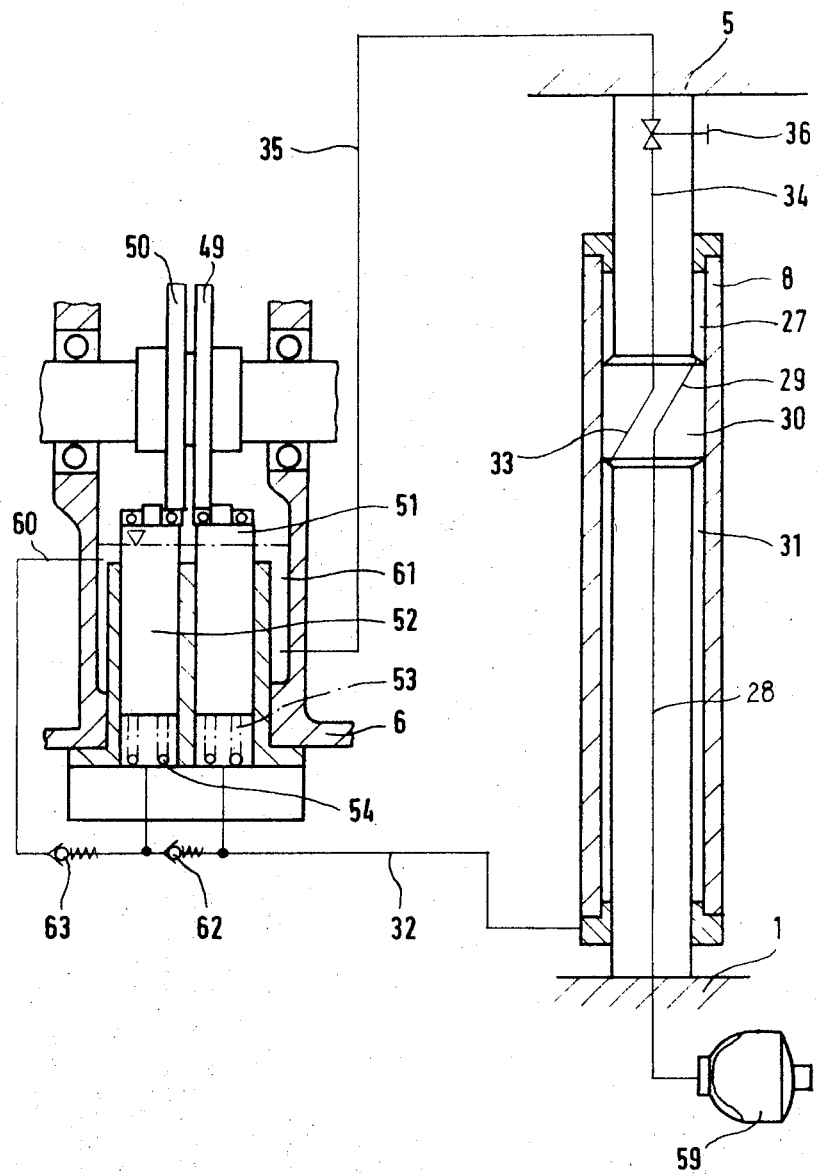
FIG. 5 is a partly cross-sectional, partly diagrammatic view of the hydraulic control system of the machine.

Referring now to FIGS. 4 and 5 together, a practically constant fluid pressure is maintained in cylinder chamber 27, fluid being delivered thereto from a pressure reservoir arranged in the machine pedestal 1. The fluid under pressure is delivered through an axial bore 28 in the column 3 and at least one inclined bore 29 in the piston portion 30, and constantly tends to lift cylinder 8 with attached saw frame carriage 6, and thus the saw blade 14, away from the workpiece.

On the other hand, through an inlet conduit 32 hydraulic pressure medium is delivered to the cylinder chamber 31, by which medium the feed movement of the saw frame carriage 6, and thus the saw blade 14, is effected in the direction towards the workpiece 12 against the action of the pressure prevailing in the cylinder chamber 27. If the cutting pressure between the saw blade 14 and the workpiece exceeds a value at which the load capacity of the saw blade 14 reaches its limit, the pressure medium in the cylinder chamber 31 can flow out of chamber 31. This occurs through an outlet of this chamber, provided by at least one inclined outlet bore 33 in the piston portion 30, through an axial outlet bore 34 in the column 3, through a return conduit 35, and back to a container 61 for the pressure medium. This container 61 is mounted in the carriage 6.

The bores 28 and 34 are arranged in alignment in the column 3 as seen in FIG. 3 and seen is a cross over in the region of the piston portion 30.

For setting the maximum cutting pressure and thus the maximum pressure possible in the cylinder chamber 31, an adjustable outlet throttle ball valve 36 is provided, and this is seated in an enlarged-diameter end portion of the outlet bore 34 in the column 3. The ball of valve 36 is spring-loaded in the valve-closing direction by a compression spring 37 resting upon the ball and the spring pressure is adjustable through a slider 38 which engages the top end of spring 37. Slider 38 is engageable by a spiral cam 39, so that the axial position of the slider 38 can be varied, to adjust the spring pressure, by rotation of the cam. The cam 39 is rotatably mounted in a housing 40 which is secured on common connection piece 5, and is rotatable by a hand wheel 41, seen in FIGS. 2 and 4.

The cam 39 has a flat portion 42 which, when brought opposite the slider 38, as in the position illustrated in FIG. 3, causes the outlet throttle valve 36 to be completely relieved of spring pressure from spring 37. Thus, after the workpiece has been cut through, turning of the cam 39 to that position allows the carriage 6, with the bow frame 15 and saw blade 14, to lift and be returned to its initial position under the action of the fluid pressure prevailing in the cylinder chamber 27. In order that pressure medium in cylinder chamber 31 can pass from the bore 34 into the return conduit 35, the slider 38 has an axial bore 43 and a radial bore 44 connected to return conduit 35.

Referring to FIG. 4, a shaft 46 journalled in the saw frame carriage 6 is driven by a pinion 45 on the shaft of motor 23 through a reduction gear, generally indicated at 46', associated with one end of the shaft 46. Fixed on the other end of the shaft 46 is a crank disc 47 fitted eccentrically with a crank pin 48 on which is rotatably mounted the roller 21 which engages in the groove 20 of the bow frame 15.

Also fixed to an intermediate portion of the shaft 46 are two circular eccentrics 49 and 50. Eccentric 49 actuates a pump 51 which is in hydraulic communication, via the inlet conduit 32, with the cylinder chamber 31 of the cylinder-piston assembly, as seen in FIGS. 3 and 5, while the eccentric 50 actuates a charging piston 52. The piston of the pump 51 is kept constantly operatively in abutment with the accentric 49 by a compression spring 53, and similarly the charging piston 52 is kept constantly operatively in abutment with the eccentric 50 by a compression spring 54.

FIG. 4 also shows the provision of sliding guides 55, 56, 57 and 58 for the bow frame 15 in the saw frame carriage 6.

The manner of operation of the hydraulic control system of the machine is illustrated diagrammatically in FIG. 5.

FIG. 5 diagrammatically shows the pressure reservoir 59, which is mounted in the machine pedestal, and which, through the bores 28 and 29, maintains a constant pressure in the cylinder chamber 27 of the cylinder-piston assembly, as a result of which saw frame carriage 6, and hence saw blade 14, tend to be lifted upwardly and away from the workpiece 12.

The charging piston 52 delivers hydraulic pressure medium in opposition to this pressure during every cutting stroke of the bow frame 15, through the inlet conduit 32 into the cylinder chamber 31 of the cylinder-piston assembly. Then, during each return stroke of the saw frame 15, the charging piston draws medium through the conduit 60 from the container 61 formed on the saw frame carriage 6, under the action of the spring 54. A pressure valve 62 provided in the conduit 32 and a suction valve 63 provided in the conduit 60 allow the charging piston to function in this manner.

At the same time the pump 51 is actuated by the eccentric 49 in such a way that, under the action of the spring 53 and of the pressures prevailing in the respective cylinder chambers 27 and 31, and through its hydraulic connection via conduit 32 to the cylinder chamber 31, the pump begins approximately in the middle of a cutting stroke of the bow frame 15 to receive pressure fluid from the conduit 32. Pump 51 then acts to deliver the pressure fluid, which it received during the preceding cutting stroke, approximately in the middle of the return stroke of the saw bow frame, into the conduit 32 again and thus into the cylinder chamber 31.

Thus, by action of pump 51 in cooperation with that of the charging piston 52, the saw blade is lifted away from the workpiece at the end of a cutting stroke and applied to the workpiece again at the beginning of the next cutting stroke. Since the saw blade needs to be lifted only a very slight distance from the workpiece for the return stroke, the displacement volume of the pump 51 may be made small in relation to that of the charging piston 52.

It will be understood that the above description of the present invention is susceptible to various modifications, changes and adaptations, and the same are intended to be comprehended within the meaning and range of equivalents of the appended claims.

I claim:

1. A bow saw machine for operating on a workpiece and comprising:
   A. A machine pedestal having a table plate thereon;
   B. a clamping device associated with said table plate for clamping the workpiece on said table plate;
   C. vertically disposed guide means upstanding from said machine pedestal, and a movable saw frame carriage mounted on said guide means to be translatable vertically relative to said machine pedestal;
   D. a bow frame having a back and front and rear arms and mounted on said movable saw frame carriage for movement with respect thereto, first means disposed between said bow frame and said carriage for rectilinearly guiding and reciprocally driving said bow frame, said first means including a crank drive engaging said bow frame in a guide thereon, and a rectilinear guide in a rearward portion of the back of said saw bow frame and in front of the point of action of the crank drive on said bow frame, said bow frame being arranged to hold a saw blade disposed parallel to said rectilinear guide; and
   E. second means for hydraulically controling translation of said saw frame carriage for feed of the saw blade to the workpiece and application of cutting pressure on the saw blade, said second means comprising,
      1. a cylinder-piston assembly composed of a hydraulic cylinder and a piston with a piston rod, contained in said cylinder to define two chambers within said cylinder, a first of said chambers being to one-side of said piston and a second of said chambers being to the other side of said piston, said assembly being operatively connected between said saw frame carriage and said machine pedestal.
      2. third means defining an inlet to said first chamber located at one side of said piston, a pressure valve, and a charging piston which is in hydraulic communication with said inlet through said pressure valve, and a first actuating means selectively actuating said charging piston to deliver fluid under pressure to said first chamber to urge said saw frame carriage in a direction toward said machine pedestal;
      3. a container for hydraulic pressure fluid, a suction valve, and conduit means connecting said charging piston in hydraulic communication with said container through said suction valve;
      4. fourth means defining an outlet in said first chamber, an adjustable throttle valve in said outlet, and further conduit means connecting said outlet to said container for the flow of hydraulic pressure fluid, through said adjustable throttle valve, from said first chamber to said container; and
      5. a hydraulic pump in hydraulic communication with said first chamber through said inlet, a second actuating means selectively actuating said pump, said first and second actuating means being operatively associated with said crank drive to be operable in dependence upon said crank drive for actuating said charging piston and said pump in timed relation to the reciprocating motion of said bow frame in such a manner that said charging piston is caused to draw pressure fluid from said container during the return stroke of said bow frame and deliver it to said first chamber during the cutting stroke of said bow frame, and that raising of said saw frame carriage for lifting the saw blade away from the workpiece and lowering said saw frame carriage for placing the saw blade upon the workpiece take place under the action of said pump in succession in synchronism with successive reversals in the reciprocating movement of said bow frame.

2. An arrangement as defined in claim 1, wherein said guide means for said saw frame carriage consist of two guide columns, and further comprising a common connection piece to which said guide columns are secured at their upper ends remote from said machine pedestal.

3. An arrangement as defined in claim 2, wherien said two guide columns are arranged at respectively opposite sides of said saw frame carriage.

4. An arrangement as defined in claim 2, wherein said cylinder of said cylinder-piston assembly is fixed to said saw frame carriage, said cylinder having a guide face at each end of said cylinder and said guide faces slidably embracing one of said guide columns, and said one guide column forms said piston rod and said piston of said cylinder-piston assembly, with said pIston being disposed on said guide column between its ends and within said cylinder.

5. An arrangement as defined in claim 4, further comprising means defining an outlet bore in said piston rod of said cylinder-piston assembly, and wherein said outlet of said first cylinder chamber communicates with said outlet bore, and said adjustable throttle valve is disposed in said outlet bore.

6. An arrangement as defined in claim 5, wherein said adjustable throttle valve is operatively disposed with respect to said common connection piece and comprises a spring-loaded ball valve, having a compression spring with one end associated with said ball valve, a manually rotatable spiral cam mounted on said common connection piece and said cam being operatively associated with the end of said compression spring remote from said ball valve.

7. An arrangement as defined in claim 2, further comprising a third guide column which is also secured at its upper end to said common connection piece, and a clamping jaw, said clamping jaw being mounted on said third guide column to be adjustably displaceable therealong for clamping the workpiece against said table plate of said machine pedestal.

8. An arrangement as defined in claim 7, wherein said third guide column is disposed on said machine pedestal to also provide an abutment stop for the workpiece.

9. An arrangement as defined in claim 8, wherein the saw blade operates against the workpiece with a drawing cut.

10. An arrangement as defined in claim 9, wherein said third guide column is disposed to form an abutment stop for the workpiece in the cutting direction.

11. An arrangement as defined in claim 1, wherein said crank drive is a cross-guide gearing without a crank guide, and is operatIvely assciated with said bow frame in the region of a portion thereof which is perpendicular to the saw blade and adjacent to said rectilinear guide.

12. An arrangement as defined in claim 1 further comprising, fluid pressure means acting to compensate for the total weight of said saw frame carriage, said fluid pressure means providing a constantly acting fluid pressure which is applied to said second chamber of said cylinder of said cylinder-piston assembly and said second chamber receives fluid pressure only from said fluid pressure means.

13. An arrangement as defined in claim 12, wherein said fluid pressure means includes a pressure reservoir which is disposed on said machine pedestal, and further comprising another means defining a bore in said piston rod of said cylinder-piston assembly through which said second cylinder chamber is in communication with said reservoir.

14. An arrangement as defined in claim 1, wherein said container for hydraulic pressure medium is mounted on said saw frame carriage.

* * * * *